(12) United States Patent
McNeil et al.

(10) Patent No.: US 6,936,492 B2
(45) Date of Patent: Aug. 30, 2005

(54) SINGLE PROOF MASS, 3 AXIS MEMS TRANSDUCER

(75) Inventors: Andrew C. McNeil, Scottsdale, AZ (US); Gary Li, Gilbert, AZ (US); Daniel N. Koury, Jr., Mesa, AZ (US)

(73) Assignee: Freescale Semiconductor, Inc., Schaumburg, IL (US)

( * ) Notice: Subject to any disclaimer, the term of this patent is extended or adjusted under 35 U.S.C. 154(b) by 0 days.

(21) Appl. No.: 11/009,109

(22) Filed: Dec. 10, 2004

(65) Prior Publication Data

US 2005/0097957 A1 May 12, 2005

Related U.S. Application Data

(62) Division of application No. 10/615,328, filed on Jul. 8, 2003, now Pat. No. 6,845,670.

(51) Int. Cl.[7] .............................................. H01G 5/18
(52) U.S. Cl. ..................................................... 438/50
(58) Field of Search ..................... 73/514.32; 361/280; 438/50, 52

(56) References Cited

U.S. PATENT DOCUMENTS

| | | | |
|---|---|---|---|
| 4,736,629 A | 4/1988 | Cole | |
| 5,487,305 A | 1/1996 | Ristic et al. | 73/514.32 |
| 5,594,171 A | 1/1997 | Ishida et al. | 73/514.32 |
| 5,806,365 A | 9/1998 | Zunino et al. | 73/514.16 |
| 5,939,633 A | 8/1999 | Judy | 73/514.32 |
| 5,962,787 A | 10/1999 | Okada et al. | |
| 6,148,670 A | 11/2000 | Judy | 73/514.32 |
| 6,159,761 A | 12/2000 | Okada | |
| 6,223,598 B1 | 5/2001 | Judy | 73/514.32 |
| 2002/0002864 A1 | 1/2002 | Kvisteroey et al. | |

OTHER PUBLICATIONS

PCT Notification of Transmittal of the International Search Report and the Written Opinion of the International Searching Authority, or the Declaration, Mailing Date: Jan. 28, 2005, International Application No.: PCT/US04/21927.

Selvakumar, "A High Sensitivity Z-Axis Torsional Silicon Accelerometer", Dept. of Electrical Engineering and Computer Science, University of Michigan, 1996, pp. 765-768.

J. Connelly, A. Kourepenis, T. Marinis, "Micromechanical Sensors in Tactical GN&C Applications", The Charles Stark Draper Laboratory, Inc., Published by the American Institute of Aeronautics and Astronautics, Inc. (2000).

Giorgio Fontana, "High Performance Electrostatic Sensors and Actuators for LISA Proof Mass Control", arXIv:physics/0111006, vol. 4 (Jan. 25, 2002).

Huikai Xie, Gary K. Fedder, "Vertical Comb-Finger Capacitive Actuation and Sensing For CMOS MEMS", Sensors and Actuators A95, 212-221 (2001).

C. Byl, D. W. Howard, S. D. Collins and R. L. Smith, "Micromachined, Multi-Axis, Accelerometer with Liquid Proof Mass",Dept of Electrical & Computer Engineering University of California, Davis, California, Final Report 1998-99 for MICRO Project 98-145.

(Continued)

*Primary Examiner*—John E. Chapman
(74) *Attorney, Agent, or Firm*—John A. Fortkort; Fortkort Grether + Kelton LLP

(57) ABSTRACT

A transducer is provided herein which comprises an unbalanced proof mass (51), and which is adapted to sense acceleration in at least two mutually orthogonal directions. The proof mass (51) has first (65) and second (67) opposing sides that are of unequal mass.

14 Claims, 5 Drawing Sheets

OTHER PUBLICATIONS

Harvey Weinberg, "Dual Axis, Low g, Fully Integrated Accelerometers", Analog Dialogue 33-1 (1999 Analog Devices).

Michael Kraft, "Micromachined Inertial Sensors—Recent Developments at BSAC", pp. 1-37 (University of California—Berkeley) (presentation given at the New England American Vacuum Society Meeting in Burlington, MA, Jun. 15, 1998).

"Low-Cost ±2 g/±10 g Dual Axis IMEMS® Accelerometers with Digital Output—ADXL202/ADXL210", Analog Devices, Inc. (C3037b-2, Rev. B, Apr., 1999).

"Low-Cost 2 g Dual-Axis Accelerometer with Duty Cycle Output—ADXL202E*", Analog Devices, Inc. (C02064-2. 5-10, rev. A, 2000).

Gary Li and Ampere A. Tseng, "Low Stress Packaging of a Micromachined Accelerometer", IEEE Transactions on Electronics Packaging Manufacturing, vol. 24, No. 1 (Jan. 2001).

SINGLE PROOF MASS, 3 AXIS MEMS TRANSDUCER

This application is a divisional application of U.S. patent application Ser. No. 10/615,328, filed Jul. 8, 2003 U.S. Pat. No. 6,845,670, and is incorporated by reference herein in its entirety.

FIELD OF THE INVENTION

The present invention relates generally to microelectromechanical sensors (MEMS), and more particularly to transducers containing proof masses.

BACKGROUND OF THE INVENTION

Transducers are useful in inertial guidance systems to sense the acceleration or orientation of a device, such as a spacecraft, aircraft, land-based vehicle, or handheld device. They are also used in vehicles to sense impacts and deploy various devices to protect the passengers (for example, air bags in automobiles). Transducers may be required to sense acceleration or other phenomena along one, two, or three axes or directions. From this information, the movement or orientation of the device can be ascertained.

In the ongoing effort to reduce the size and cost of transducers, a variety of sensing devices have been proposed. Many of these devices, especially those which function as accelerometers, include capacitive structures, some of which are constructed using semiconductor manufacturing techniques and/or bulk micromachining. The capacitive structures generally consist of at least one conductive plate, formed of doped silicon or the like, which is mounted on a substrate by way of a compliant suspension. The plate is positioned parallel to a planar surface of the substrate and forms capacitances with fixed structures mounted on the substrate. When the plate moves due to acceleration, the capacitances between the plate and these fixed structures changes. These changes are then sensed by the electronic circuitry of the device and are converted to signals representative of the acceleration.

FIGS. 1 and 2 illustrate one example of a prior art capacitive accelerometer 111 of the type described above. The accelerometer, which is adapted to sense Z axis accelerations (that is, accelerations perpendicular to the major planar surface of the device) comprises a proof mass plate 113 that is suspended by torsional spring flexures 115 in a see-saw type configuration. This proof mass is "unbalanced" because of the extra mass present on the "heavy" end 116. The proof mass plate is supported by a central anchor 121 which is attached to a substrate 123 (see FIG. 2). When the device experiences an acceleration along the Z-axis, the proof mass rotates (or tips) around the flexure axis defined by the suspension. The resulting motion, which is proportional to the amount of acceleration the device is experiencing, is measured by capacitive sensor plates 117, 119 disposed beneath the proof mass, and is converted into electronic signals representative of the acceleration. The use of an unbalanced proof mass in this device is required, because a balanced proof mass would not tilt when subjected to Z axis acceleration, and hence would not properly sense the acceleration.

The device shown in FIGS. 1 and 2 is a single axis accelerometer which senses acceleration only along the Z axis. However, accelerometers are also known to the art which are adapted to sense accelerations along multiple axes. One such device is shown in FIG. 3. The device illustrated therein is an XY displacement accelerometer 231 that is adapted to sense accelerations along two orthogonal in-plane axes of the device. The accelerometer includes a proof mass plate 233 that comprises a central mass 235 attached to a frame 237 by way of first 241 and second 243 sets of sense fingers. The first and second sets of sense fingers are disposed in a mutually perpendicular arrangement. The frame is supported by a plurality of anchors 245 to which it is attached by a series of compliant springs 247. In structures of this type that are designed to sense a similar magnitude acceleration along the two orthogonal sense axes, the springs 247 will have similar stiffness in the X and Y directions.

In FIG. 3, each sense finger 241 is surrounded by two sets of fixed fingers 251 and 252, respectively. Similarly, each sense finger 243 is surrounded by two sets of fixed fingers 253 and 254, respectively, which are anchored to the substrate. When the proof mass moves in the Y direction, the capacitances between the moving fingers 241 and the fixed fingers 251, 252 change. Similarly, when the proof mass moves in the X direction, the capacitances between the moving fingers 243 and the fixed fingers 253, 254 change. The device is provided with electronic circuitry which converts these capacitive changes to signals representative of the acceleration along the X and Y axes.

The accelerometers described above are manufactured as single axis or dual axis devices. However, some applications require the ability to sense acceleration along three mutually orthogonal axes. This has been achieved, in some instances, by utilizing three accelerometers of the type depicted in FIG. 1, and positioning them such that their sensitive axes are disposed in a mutually orthogonal configuration. However, the final package resulting from such a configuration is inherently bulky, since each accelerometer must be positioned such that its sense axis is orthogonal to the sense axes of the other accelerometers. Hence, the entire package can never be formed as a single planar device.

Some transducers have also been proposed which are adapted to sense accelerations along three axes, and which are more compact than the three-axis accelerometer designs described above. An example of such a transducer is shown in FIGS. 7 and 8. In the construction depicted therein, the middle layer 32 typically serves as a single proof mass equipped with capacitive plates 30 for sensing accelerations along the X and Y axes. The devices of FIGS. 7 and 8 are similar in some respects to the devices of FIG. 3, but have additional plates 40 and 43 disposed above the proof mass 32, as well as a series of conductors 23, 24, 26 and 27 mounted on the substrate 11 and disposed below the proof mass that are capacitively coupled to the proof mass. Accelerations along the Z axis (that is, the direction orthogonal to the major surfaces of the substrate) are sensed in this type of device by measuring the differential capacitance between the proof mass 30 and the plates above, 40–43, vs. below, 23, 24, 26 and 27. Accelerations in the x-y plane (that is, the plane of the major surfaces of the substrate) are sensed by measuring differential overlap capacitances between the proof mass and the appropriate plates below it (i.e., 13 and 14 vs. 18 and 19, 16 and 17 vs. 21 and 22).

While the transducers shown in FIGS. 7 and 8 are a notable advance in the art and do achieve reductions in the size of the overall package, their construction requires a "three layer" process flow. This phrase refers to the number of layers of conductive material (typically doped polysilicon) used to fabricate the sense capacitor plates present in the device or required by the manufacturing process. In particular, the devices of FIGS. 7 and 8 require one conductive layer each for the proof mass 32, the series of conductors 23, 24, 26 and 27, and the plates 40 and 41. By contrast, the accelerometers depicted in FIGS. 1 and 2 may be fabricated by a "two layer" process flow. In particular, in those devices, the bottom plates 117, 119 are formed from a first conductive layer, and the proof mass 113 is formed from a second conductive layer. Compared to a two layer process flow, a three layer process flow is less desirable in that it requires at least two additional masking steps. Consequently, devices manufactured by a three layer process are generally more expensive to manufacture, and have a lower yield, than comparable devices manufactured via a two layer process.

Transducers made by a three layer process flow are also typically more susceptible to packaging stresses and conductive layer stress gradients than those made by two layer process flows. These effects are particularly problematic for the Z axis output of the device. This can be appreciated from FIG. 9, which depicts a general three layer device 121 containing top 123, middle 125 and bottom 127 layers supported on a substrate 129. The middle layer 125 and top layer 123 are supported-several microns above the substrate 129, and thus tends to deform along the Z axis when the device is subjected to strain along the in-plane axes of the substrate. Such strain is commonly encountered, for example, during thermal cycling. In addition, stress gradients in the conductive layers 123 and 125 also contribute to the deformation (curvature) of these layers. The deformation of the top layer modifies the capacitance 131 between the top and middle layers, and hence changes the Z axis output of the device. Packaging stresses can be reduced by coating the transducer die with an elastomer (sometimes referred to as a "dome coat"). However, such coatings complicate the manufacturing process.

There is thus a need in the art for a compact, single die transducer that can sense along multiple axes, that can be fabricated as a planar structure in a two layer process flow, that is less susceptible to package stress and conductive layer stress gradients, and that does not require the use of a dome coat or other features designed to reduce packaging stress.

SUMMARY OF THE INVENTION

In one aspect, a transducer is provided which comprises an unbalanced proof mass, and which is adapted to sense acceleration in at least two, and preferably three, mutually orthogonal directions. The transducer preferably contains a single proof mass that is mounted to the substrate on a suspension that is compliant in all three axes, and two or more conductive plates that are mounted on the substrate under the proof mass. The proof mass preferably comprises a first set of sense fingers aligned along a first axis, and a second set of sense fingers aligned along a second axis, wherein said first and second axes are orthogonal. Each of the sense fingers in the first and second set is typically surrounded by two parallel fingers that are fixably attached to a substrate. The first and second set of sense fingers are preferably disposed in an arrangement that has at least two planes of symmetry, and more preferably, at least four planes of symmetry. It is also preferred that the conductive plates are arranged with the same planes of symmetry as the first and second sets of sense fingers, that the substrate is mounted on compliant springs that are disposed in an arrangement having at least two planes of symmetry, and that the proof mass is asymmetric about the line of symmetry between the two bottom plates. The first and second set of sense fingers in the transducer preferably have longitudinal axes that are parallel to a first plane, and one of said two mutually orthogonal directions is perpendicular to said first plane. The proof mass of the transducer has a central portion with a plurality of sense fingers disposed therein, and opposing sides adjacent to the central portion that are of unequal mass. The opposing sides are of preferably of unequal dimensions. The transducer may further comprise first and second capacitive plates which are disposed beneath the proof mass, and which are adapted to detect movement of the proof mass along an axis perpendicular to the first plane.

In another aspect, a transducer, such as an accelerometer, is provided which comprises a proof mass having first and second sets of fingers adapted to sense acceleration along first and second mutually orthogonal axes, first and second capacitive plates adapted to sense acceleration along a third axis that is orthogonal to said first and second axes, and a plurality of anchors for said proof mass, each of said anchors being attached to said proof mass by way of a spring, and wherein the weight of the proof mass is asymmetrically supported by the anchors. The first and second plates are typically disposed on the same side (vertically) of the proof mass and are supported on a substrate, and are adapted to capacitively sense acceleration in a direction perpendicular to said first and second axes.

In yet another aspect, a method for making a transducer is provided, comprising the steps of providing a substrate, depositing a first conductive layer on said substrate, patterning said first conductive layer to define first and second capacitive structures therein, depositing a sacrificial layer over said first conductive layer, depositing a second conductive layer over the sacrificial layer, and patterning the second conductive layer to define a proof mass therein such that the center of mass of the proof mass is asymmetrically disposed relative to said first and second plates. The first and second conductive layers may comprise a metal, but preferably comprise polysilicon, and the first and second capacitive structures are plates. The proof mass, which may be asymmetrically disposed relative to said first and second plates, preferably comprises a first set of sense fingers whose longitudinal axes are parallel to a first axis, and a second set of sense fingers whose longitudinal axes are parallel to a second axis. The proof mass also preferably comprises a plurality of fixed fingers, such that each sense finger is disposed between a pair of fixed fingers, and a plurality of compliant structures that support the proof mass above the first and second capacitive structures. The transducer may be an accelerometer adapted to sense acceleration in a direction perpendicular to the substrate by measuring the capacitances between the proof mass and the first and second capacitive structures. Preferably, the first and second sets of sense fingers, the plurality of compliant structures, and the plurality of fixed fingers are disposed in an arrangement that has at least one plane, and more preferably at least two planes, of mirror symmetry orthogonal to a major surface of the second conductive layer. The method may further comprise the steps of removing at least a portion of the sacrificial layer to obtain release of the proof mass, or depositing a metal on a surface of the proof mass such that the center of mass of the proof mass is asymmetrically disposed relative to said first and second plates.

These and other aspects of the teachings herein are described in further detail below.

DETAILED DESCRIPTION

The terms "two layer" and "three layer", when used herein in reference to an accelerometer or transducer or to a process flow for making the same, refer to the number of layers of conductive material (typically doped polysilicon) used to fabricate the sense capacitor plates present in the device or required by the manufacturing process.

In accordance with the teachings herein, a compact, single die transducer, which may be, for example, an accelerometer or other sensing device, is provided which may be fabricated in a two layer process flow. Embodiments made from a two layer process flow may be easier and less expensive to implement than a typical three layer process flow. Moreover, the resulting transducer has no contribution to package stress sensitivity from the third conductive layer. The transducer can be made to sense along two or more mutually orthogonal axes.

Figure 4:
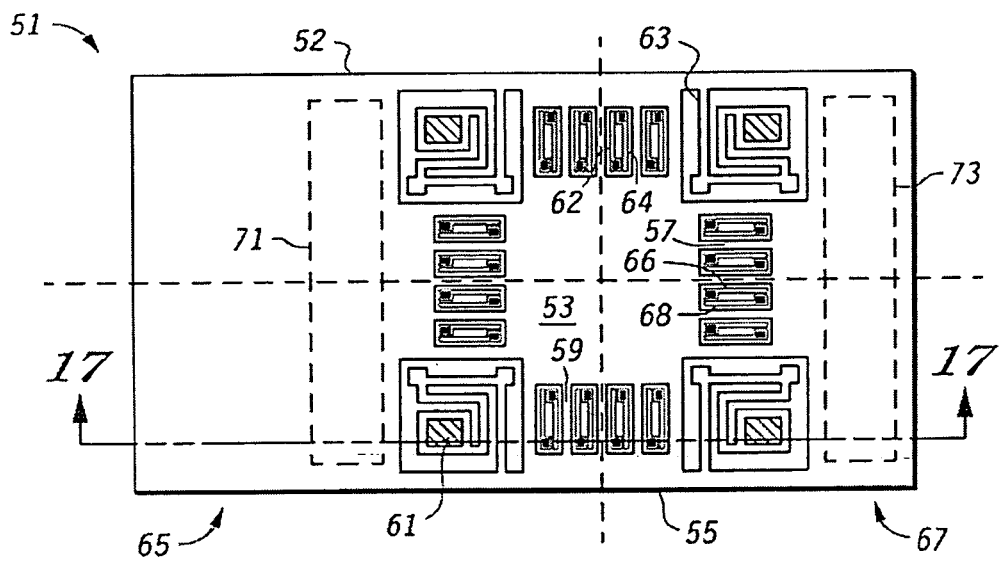
FIG. 4 is an illustration of a first embodiment of a 3-axis accelerometer made in accordance with the teachings herein.
Figure 5:
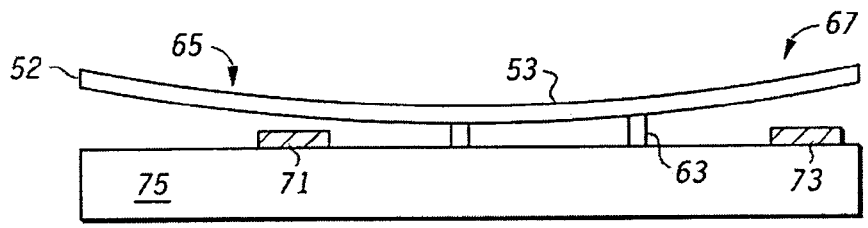
FIG. 5 is a simplified cross-sectional illustration showing the unbalanced proof mass in a device of the type depicted in FIG. 4 (a more detailed cross-sectional illustration taken along LINE 17—17 of FIG. 4 is shown in FIG. 17)

FIGS. 4–5 depict one embodiment of a transducer 51 made in accordance with the teachings herein. The device comprises a central mass 53 which is supported from a frame 55 by Y sense fingers 57 and X sense fingers 59. The frame, in turn, is attached to a plurality of anchors 61 by a series of springs 63 that are preferably compliant in three mutually orthogonal directions. The anchors are mounted on a die or other substrate 75 (see FIG. 5). Each Y sense finger 57 is surrounded by two pairs of fixed fingers 66 and 68. Similarly, each X sense finger 59 is surrounded by two fixed fingers 62 and 64. When the transducer experiences acceleration along the X axis, the distance between the X sense fingers 59 and the adjacent fixed fingers 62 and 64 changes, thus changing the capacitance between these fingers. This change in capacitance is registered by the sense circuitry (not shown) and converted to an output signal representative of the acceleration along this axis. Acceleration along the Y axis is sensed in an analogous manner by registering the change in capacitance between the Y sense fingers 57 and the corresponding fixed fingers 66 and 68.

The frame 55 has opposing sides 65, 67 which are of unequal mass. In this particular embodiment, this is accomplished by constructing the frame such that the opposing sides 65 and 67 are essentially equal in thickness and width, but unequal in length. Consequently, side 65 has greater mass than side 67, thus causing the proof mass 52 (which includes the frame 55 and the central mass 53) to rotate/tilt about the Y axis in response to acceleration along the Z axis. This acceleration is sensed by capacitive plates 71 and 73 which are disposed beneath the proof mass.

In the device of FIGS. 4–5, the Y sense fingers 57, the X sense fingers 59, the fixed fingers 62, 64, 66, 68, and the springs 63 are evenly spaced and are disposed on opposing sides of the central mass 53 in such a way that the arrangement of these elements has two planes of mirror symmetry. Such symmetry is advantageous in that it allows for the substantial cancellation of cross-axis sensitivities so that, in sensing acceleration along the X and Y axes, the device senses only the components of acceleration that occur along each of these axes. In particular, this symmetry has the effect that each cross-axis sensitivity occurring at one sense finger is cancelled by an equal, but opposite, cross-axis sensitivity occurring at another sense finger.

Figure 6:
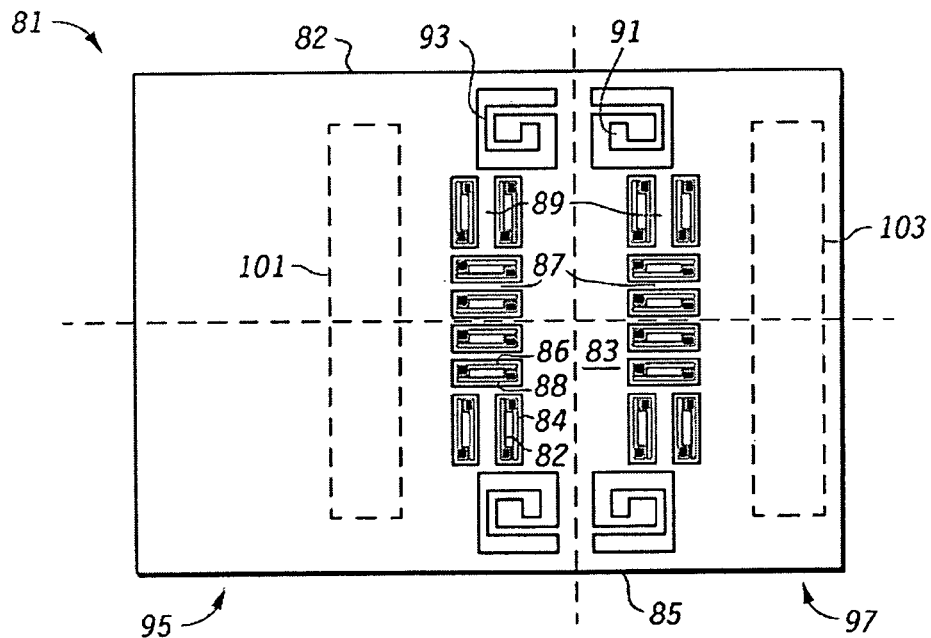
FIG. 6 is an illustration of a second embodiment of a 3-axis accelerometer made in accordance with the teachings herein.
Figure 7:
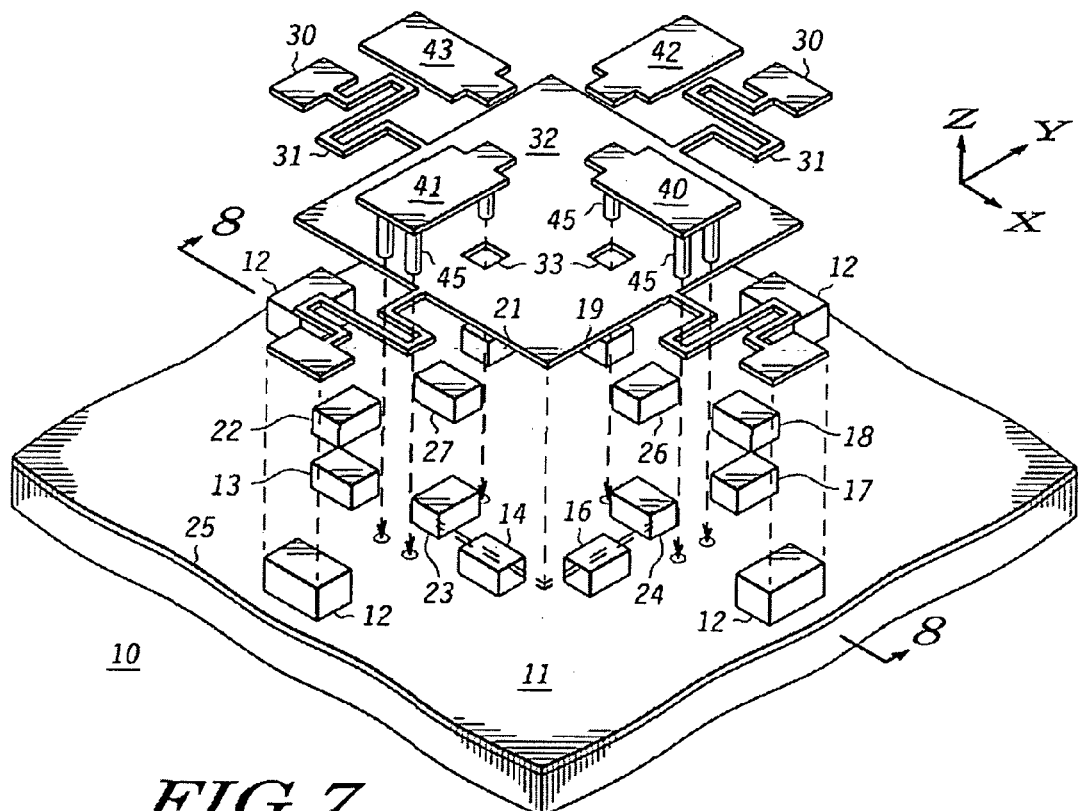
FIG. 7 is an illustration of a prior art accelerometer made by a three layer process flow.
Figure 8:
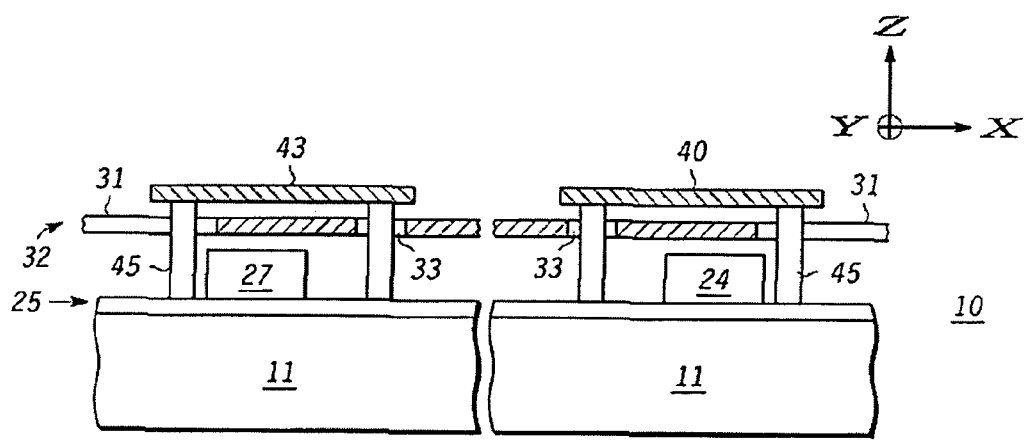
FIG. 8 is a cross-section taken along LINE 8—8 of FIG. 7.

Various other configurations for the proof mass are also possible in accordance with the teachings herein. One such configuration is shown in FIG. 6. The transducer 81 depicted therein comprises a central mass 83 which is supported from a frame 85 by first 87 and second 89 sets of sensing fingers. Each of the first set of sensing fingers 87 is disposed between fixed fingers 86 and 88. Likewise, each of the second set of sensing fingers 89 is disposed between fixed fingers 82 and 84. The frame, in turn, is supported by a series of springs 93 that are preferably compliant in three mutually orthogonal directions. Each of the springs is attached to an anchor 91. The anchors 91 and the fixed fingers 82, 84, 86 and 88 are mounted on a die or other substrate (not shown).

The frame has opposing sides 95 and 97 which are of unequal mass. As with the embodiment of FIGS. 4–5, this is accomplished by constructing the frame such that the opposing sides 95 and 97 are essentially equal in thickness and width, but unequal in length. Consequently, side 95 has greater mass than side 97. The proof mass tilts about the Y axis in response to acceleration along the Z axis. This acceleration is sensed by capacitive plates 101, 103 disposed beneath the proof mass.

The transducer of FIGS. 4–5 is designed such that the arrangement of the first 67 and second 69 sets of sense fingers, the fixed fingers 62, 64, 66, 68, and the springs 63 has two planes of mirror symmetry. Similarly, in the transducer 81 depicted in FIG. 6, the first 87 and second 89 sets of fingers used to support the central mass 83, the fixed fingers 82, 84, 86, 88, and the springs 93 are disposed in an arrangement that has two planes of mirror symmetry. Both arrangements allow for the effective elimination of cross-axis sensitivities.

In the embodiments described in FIGS. 4 and 5, the disposition of mass in the proof mass is caused to be asymmetric by making one end of the proof mass larger than the other. However, a similar result may be achieved by other means. For example, the opposing sides 65 and 67 of FIGS. 4–5 could be of the same length and width, but of differing thickness. The mass of one of the sides could also be made greater than that of the other side through the selective addition of materials to it, as through selective metallization or the addition of further layers or structures to a surface thereof. The use of such techniques to increase the weight of a proof mass are described in commonly assigned and copending application U.S. Ser. No. 10/426,148, which was filed on Apr. 29, 2003, and which is incorporated by reference herein in its entirety.

Figure 1:
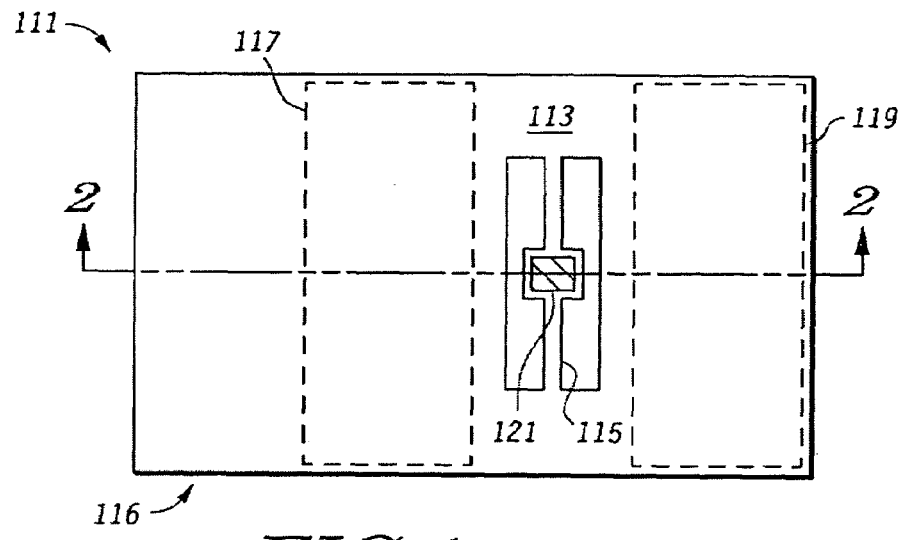
FIG. 1 is an illustration of a prior art Z axis accelerometer.
Figure 2:
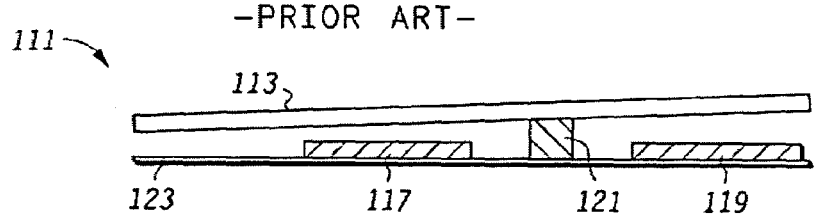
FIG. 2 is a cross-section taken along LINE 2—2 of FIG. 1.
Figure 3:
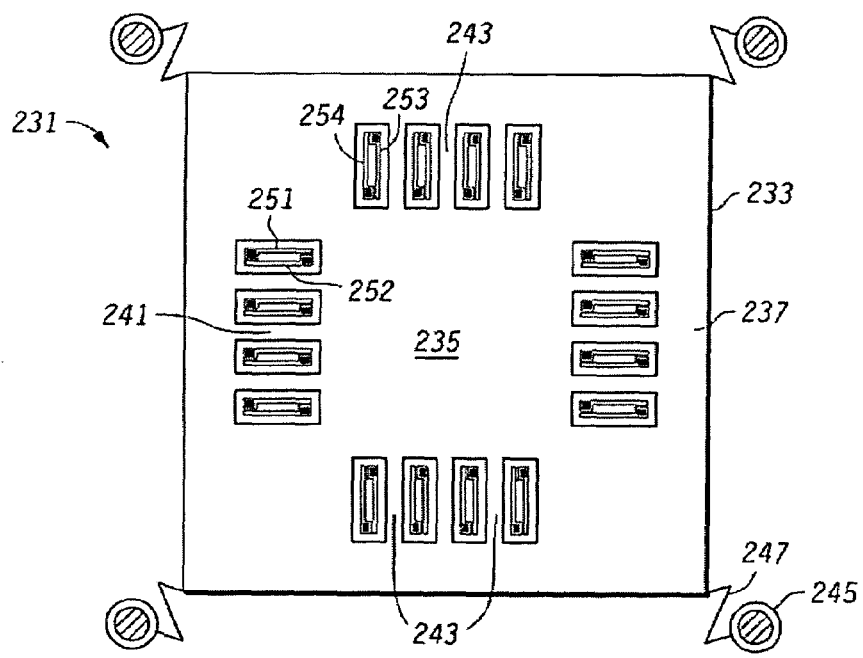
FIG. 3 is an illustration of a prior art XY accelerometer.

The transducer designs described above may have a number of advantages. For example, these devices may be made in the same type of two layer process flow used for single axis accelerometers of the type depicted in FIGS. 1 and 2 or the dual axis accelerometers of the type depicted in FIG. 3, with all the advantages that may occur attendant thereto as have been noted above. Moreover, the compact nature of these transducers allows them to be packaged in single small packages (similar to those used for single-axis accelerometers) with an appropriate ASIC (application specific integrated circuitry). These transducers may be less complex than existing three-axis transducers, with some embodiments requiring only one proof mass and one movable element bond pad, since all three sense axes use the same intermediate layer. By contrast, in devices utilizing separate transducers to sense in each direction, each transducer has its own proof mass and is supplied with its own movable element bond pad. Furthermore, the transducers disclosed herein are inherently less expensive to manufacture than three-axis devices fashioned out of individual transducers, since these transducers may be fabricated as unitary packaged devices whose fabrication costs are about the same as that for a single axis transducer. By contrast, the cost of fabricating a three-axis device fashioned out of individual transducers is approximately three times as much.

Figure 9:
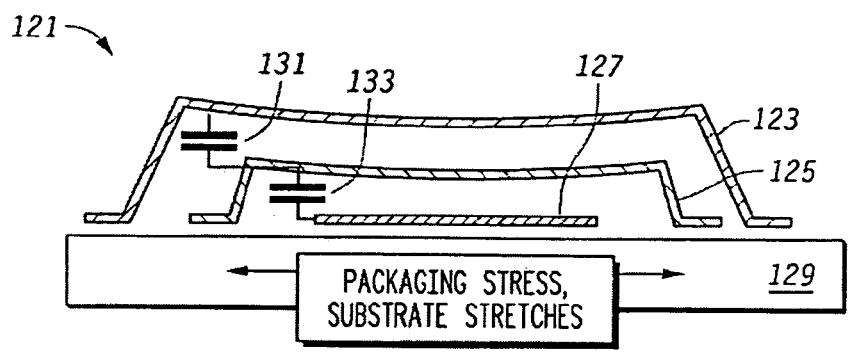
FIG. 9 is an illustration depicting the effect of packaging stress in an accelerometer made by a three layer process flow.
Figure 10:
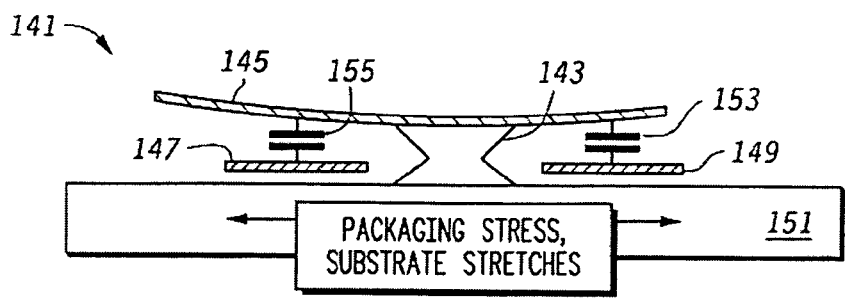
FIG. 10 is an illustration depicting the effect of packaging stress in an accelerometer made in accordance with the teachings herein.

The designs described herein may also be resistant to polysilicon stress gradients and to package stress. This fact can be appreciated with reference to FIG. 10. The transducer 141 depicted therein contains a first conductive layer in the form of first 147 and second 149 sense plates, a second conductive layer 145, and a substrate 151. The second conductive layer forms a first capacitance 155 with the first sense plate, and a second capacitance 153 with the second sense plate. Package stress causes in-plane strain (stretching) of the substrate 151, which can cause the second layer of polysilicon to move vertically, thereby increasing the gap between the second layer of polysilicon and each of the first 147 and second 149 sense plates. However, in contrast to the situation encountered in the three layer device depicted in FIG. 9, in the two layer device of FIG. 10, if the second layer of polysilicon 145 moves vertically, essentially the same change in gap occurs at both sense plates. Since the output is proportional to ratios of capacitances 153 and 155 for an easily implemented sense circuit, no change in the output signal occurs as a result of this movement. Similarly, stress gradients in the second conductive layer 145 result in a curvature as shown in FIG. 10. However, because the first 147 and second 149 sense plates are located symmetrically with respect to the anchor locations for the second layer 145, there is also no change in the output signal as a result of the curvature arising from stress gradients in the second conductive layer 145.

The transducers described herein can be achieved through a number of different fabrication routes. One such route is depicted in FIGS. 11–17.

Figure 11:
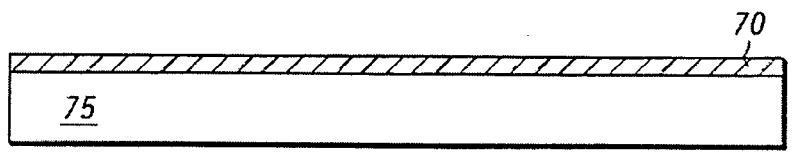
FIGS. 11–17 illustrate one embodiment of a method for making a transducer in accordance with the teachings herein.

As shown in FIG. 11, a substrate 75 is provided, which typically comprises silicon. A first conductive layer 70 of a first conductive material is deposited on a major surface of the substrate. In some applications, prior to deposition of the first conductive layer, the surface to which this layer is to be applied may be coated with one or more layers of a dielectric material. The first-conductive layer 70 preferably comprises polysilicon (which may be suitably doped in some applications), but may also comprise other semiconductor materials or various metals.

Figure 12:
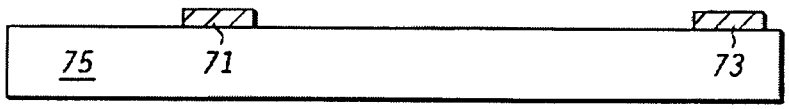
Figure 13:
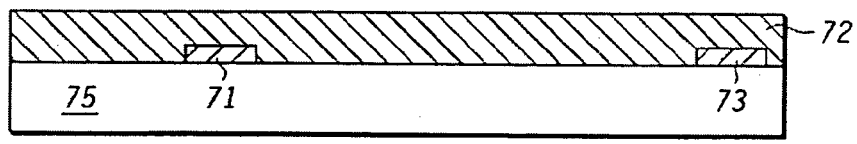

After the first conductive layer 70 is deposited, it is then masked, patterned and etched (not shown) to define capacitive plates 71 and 73, as shown in FIG. 12. A sacrificial layer 72 is then deposited over the capacitive plates as shown in FIG. 13. The sacrificial layer is preferably phosphorosilicate glass (PSG), but may also comprise other suitable sacrificial materials as are known to the art.

Figure 14:
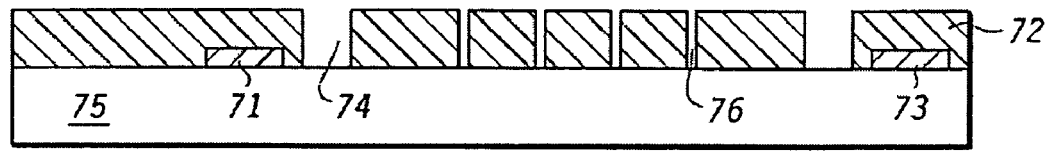
Figure 15:
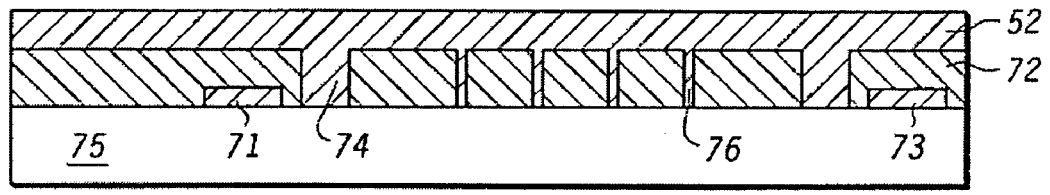

As depicted in FIG. 14, a series of contact openings 74, 76 are then formed in the sacrificial layer to define, respectively, the anchors 61 for the spring suspension system and the fixed fingers 62, 64 (see FIG. 4). If the sacrificial layer is PSG, this may be accomplished by a suitable oxide etch that exhibits etch stop behavior at the substrate 75. A second conductive material 52 is deposited in the openings and overlying the sacrificial layer 72, as shown in FIG. 15. The second conductive material preferably comprises polysilicon (which may be suitably doped according to the application), but may also comprise various metals. Even more preferably, the second conductive material is the same, or similar to, the first conductive material of layer 70 (see FIG. 11). Most preferably, the first and second conductive materials are both polysilicon. The second conductive material 52 may be deposited through chemical vapor deposition (CVD) or by other suitable means as are known to the art.

Figure 16:
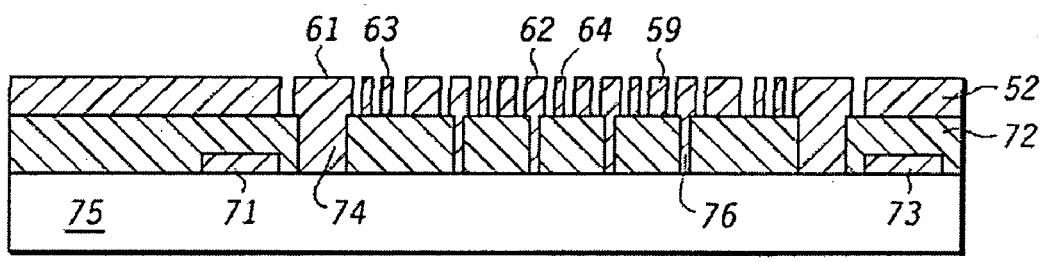
Figure 17:
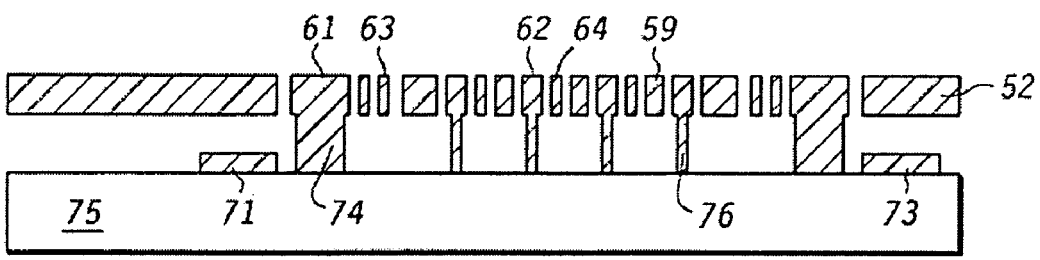

The second conductive layer is then masked, patterned and etched (not shown) to define the various elements of the proof mass as are shown in FIG. 16. In the particular embodiment depicted, these include the spring anchor 61, the fixed fingers 62 and 64, the sense fingers 59, and the springs 63. Release of the structure is then achieved through the use of a suitable etchant to result in the device depicted in FIG. 17, which is a cross-section taken along LINE 17—17 of FIG. 4. If the sacrificial layer is PSG, the etchant is preferably aqueous HF.

In the method described above, the sacrificial layer preferably comprises PSG and the second conductive material overlying it preferably comprises polysilicon. The use of these materials is advantageous in that aqueous HF, which can be used to achieve release of the structure, is highly selective to polysilicon. Hence, if the contacts 74 and 76 (see, e.g., FIG. 14) which define the anchors for the springs and fixed fingers is overlaid with polysilicon, and if aqueous HF is used to release the structure, the perimeters of these anchors will be well defined and will be relatively independent of release etch process parameters such as etch time and HF concentration.

A compact, three-axis, single die transducer and a method for making the same has been provided herein. The transducer, which may be fabricated as a planar structure in a two layer polysilicon process flow, is thus easier to fabricate than those build in a three layer process.

The above description of the invention is illustrative, and is not intended to be limiting. It will thus be appreciated that various additions, substitutions and modifications may be made to the above described embodiments without departing from the scope of the present invention. Accordingly, the scope of the present invention should be construed solely in reference to the appended claims.

What is claimed is:

1. A method for making a transducer, comprising:
   providing a substrate;
   depositing a first conductive layer on said substrate;
   patterning said first conductive layer to define first and second capacitive structures therein;

depositing a sacrificial layer over said first conductive layer;

depositing a second conductive layer over the sacrificial layer; and patterning the second conductive layer to define a proof mass and sense fingers therein such that the center of mass of the proof mass is asymmetrically disposed relative to said first and second capacitive structures.

2. The method of claim 1, further comprising the step of removing at least a portion of the sacrificial layer to obtain release of the proof mass.

3. The method of claim 1, wherein said first and second conductive layers comprise polysilicon.

4. The method of claim 1, wherein the transducer is an accelerometer adapted to sense acceleration in a direction perpendicular to the substrate by measuring the capacitances between the proof mass and the first and second capacitive structures.

5. The method of claim 1, wherein the first and second capacitive structures are plates.

6. The method of claim 1, wherein said proof mass comprises a first set of sense fingers whose longitudinal axes are parallel to a first axis, and a second set of sense fingers whose longitudinal axes are parallel to a second axis.

7. The method of claim 1, wherein said proof mass comprises a plurality of compliant structures that support the proof mass above the first and second capacitive structures.

8. The method of claim 1, wherein said proof mass comprises a plurality of fixed fingers, and wherein each sense finger is disposed between a pair of fixed fingers.

9. The method of claim 1, wherein said proof mass comprises:

a first set of sense fingers whose longitudinal axes are parallel to a first axis, and a second set of sense fingers whose longitudinal axes are parallel to a second axis;

a plurality of compliant structures that support the proof mass above the first and second capacitive structures; and a plurality of fixed fingers;

wherein each sense finger is disposed between a pair of fixed fingers, and wherein the first and second sets of sense fingers, the plurality of compliant structures, and the plurality of fixed fingers are disposed in an arrangement that has at least one plane of mirror symmetry.

10. The method of claim 9, wherein the first and second sets of sense fingers, the plurality of compliant structures, and the plurality of fixed fingers are formed in the second conductive layer, and wherein the arrangement has at least two planes of mirror symmetry about a plane orthogonal to a major surface of the second conductive layer.

11. The method of claim 10, wherein the arrangement has at least a four-fold rotational axis of symmetry around an axis orthogonal to a major surface of the second conductive layer.

12. The method of claim 1, wherein the proof mass is asymmetrically disposed relative to said first and second plates.

13. The method of claim 1, further comprising the step of depositing a material on a surface of the proof mass such that the center of mass of the proof mass is asymmetrically disposed relative to said first and second plates.

14. The method of claim 13, wherein the material comprises a metal.

* * * * *